June 18, 1929.　　　W. J. MILLER　　　1,717,802
PROCESS AND APPARATUS FOR FEEDING GLASS
Filed Jan. 31, 1921　　　5 Sheets-Sheet 2

June 18, 1929.   W. J. MILLER   1,717,802
PROCESS AND APPARATUS FOR FEEDING GLASS
Filed Jan. 31, 1921   5 Sheets-Sheet 5

Patented June 18, 1929.

1,717,802

UNITED STATES PATENT OFFICE.

WILLIAM J. MILLER, OF SWISSVALE BOROUGH, PENNSYLVANIA, ASSIGNOR TO HARTFORD EMPIRE COMPANY, OF HARTFORD, CONNECTICUT, A CORPORATION OF DELAWARE.

PROCESS AND APPARATUS FOR FEEDING GLASS.

Application filed January 31, 1921. Serial No. 441,169.

My invention consists in new and improved process and apparatus for feeding glass from a tank or other container to fabricating mechanism.

In feeding glass, where the molten glass is very hot, and therefore excessively fluid, or where the gathers are large and therefore a relatively large amount of glass protrudes through the discharge orifice between the gather detaching operations, there is a tendency for the protruding glass to thin out too much at the neck and to become stringy and improperly proportioned for satisfactory results in the fabricating mechanism.

The object which I have in view is the correction of this tendency, and to insure the formation of gathers of the desired sizes and proportions.

For the accomplishment of these and other purposes, I do not permit the depending glass to be suspended by its own weight as the glass flows from the discharge orifice but support the flowing glass in a cup or receptacle, preferably divided, wherein the glass accumulates to the desired amount and is built up to the proper proportions. When sufficient glass has accumulated in the cup, the same is opened and its contents discharged, thus stretching and thinning the neck of glass which connects the gob thus formed to the mouth of the discharge orifice. This attenuated neck is then sheared, detaching the gather which drops or is conveyed to the fabricating mechanism, the cup closing to permit the glass again to accumulate therein.

I have provided a novel form of divided cup for this purpose, and means for opening and closing the same at proper intervals.

To avoid the formation of a chilled end to the gather as a result of the glass coming into contact with the bottom of the cup, I prefer to introduce into the cup, before the admission of the glass thereto, a properly regulated quantity of liquid, such as water, which is gasified by the heat, and thus forms a gaseous cushion interposed between the bottom of the cup and the glass.

I prefer to provide the bottom of the cup with a lining or mat of asbestos or other porous material which will take up a portion of the liquid, and thus insure the even distribution of the liquid and prevent its accummulation in a puddle in the bottom of the cup.

I prefer to water-cool the cup so as to prevent the molten glass sticking thereto and to insure a clean discharge of the glass when the cup opens.

I also prefer to provide a reciprocal plunger, working in the container in relation to the discharge orifice, to properly regulate the movement of the glass through said orifice.

I also provide means for properly timing and coordinating the shearing mechanism; the cup operating mechanism, and the plunger mechanism, whereby any desired size and dimensions of gather may be produced.

Other novel features of construction and arrangement of parts will appear from the following description.

In the accompanying drawings, which are, however, merely intended to illustrate a practical embodiment of the principles of my invention, without limiting the scope of the latter to the construction shown; Fig. 1 is a front elevation of a boot of a glass tank provided with a feeder embodying the principles of my invention; Fig. 2 is a top plan view of the same; Fig. 3 is an enlarged detail showing the method of suspending the plunger from the walking beam; Fig. 3ª is a detail looking toward the left in Fig. 1 showing the adjustable fulcrum plate for the walking beam.

The following is a detailed description of the principles of my invention as the same are illustrated in the drawings.

A represents the boot or shallow extension of a glass tank, the same being composed of refractory tile or blocks. The lower portion of the boot is supported and strengthened by means of a metal casing consisting of a vertical surrounding wall 1 and a bottom plate 2.

The bottom of the boot is provided with a vertical opening 3, in which is seated the bushing 4 having a downwardly contracted or tapered bore. 5 is a refractory mouth ring which fits below the bushing 4 in a circular aperture in the bottom plate 2 with its bore registering with the bore of the bushing 4. Said mouth ring 5 is perimetrally undercut so as to seat in and be supported in a circular aperture 6 in the base plate 7 which is attached to the under face of the base plate 2.

The bore of the mouth ring forms a continuation of the bore of the bushing, and together they form the discharge orifice B of the feeder.

It is evident that the diameter of the lower end of the mouth ring bore determines the thickness of the stream of glass discharged, and therefore mouth rings of different discharge capacity are used according to the thickness of the stream of glass desired, said mouth rings being made interchangeable.

Figures 14, 15:
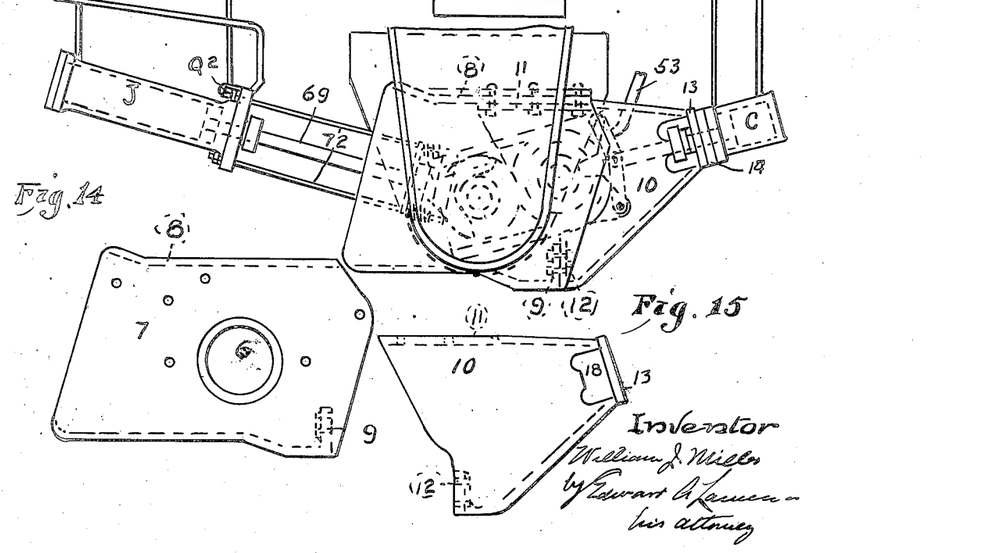
Fig. 14 is a plan view of the base plate.
Fig. 15 is a similar view of the cup cylinder supporting plate.
Figure 16:
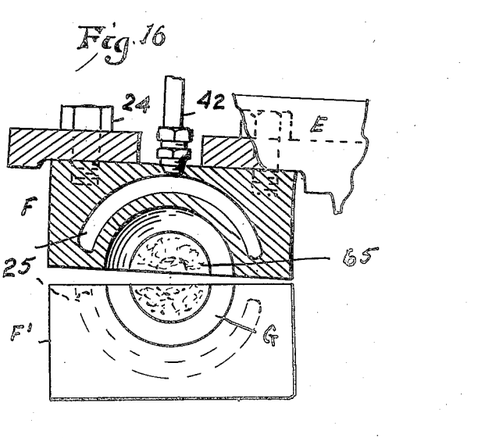
Fig. 16 is a view partially in plan and partially in horizontal section showing the cup in the act of closing together.
Figure 17:
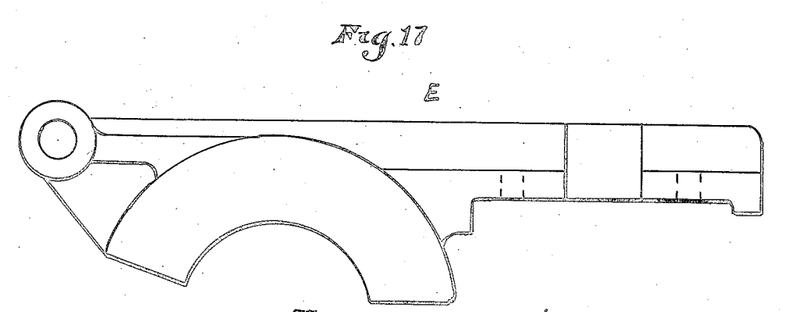
Fig. 17 is an inverted plan view of one of the cup operating levers.
Figure 18:
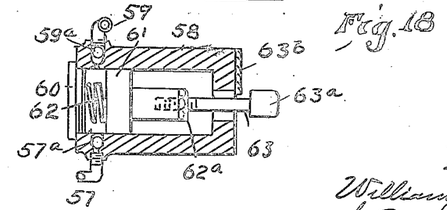
Fig. 18 is a detail of the valve for admitting liquid to the gathering cup.

The base plate 7 is shown more clearly in Fig. 14 and is provided at one side with a depending flange 8 pierced with bolt holes, and at one end with a similar but shorter flange 9.

10, shown more clearly in Fig. 15, is the plate which supports the cylinder which operates the divided cup, said plate being provided with pierced flanges 11 and 12 which abut against the flanges 8 and 9 of plate 7 and to which they are bolted. The cylinder plate 10 is of a general triangular shape, and at its outer apex is provided with a depending ring flange 13, to the outer face of which is bolted the head 14 of the cylinder C. 15 is the piston in said cylinder; and 16 the piston rod which protrudes through a gland 17 mounted on the head 14, and for which clearance is provided by aperturing the plate 10, as at 18.

D is a hinge block depending from the plate 7 and secured thereto, as by the bolts 19. The block D is provided perimetrally with an annular trough bearing 20 in which move the arcuate flanges 21 of the cup levers E and E', whose rear ends are connected by the links 22 with the outer end of the piston rod 16. 23 is an abutment flange depending from the plate 7 to hold the cup levers down in proper horizontal alinement. The front ends of the levers E and E' are recessed on their adjacent faces to receive the blocks F and F' which are secured, as by the bolts 24, and which are recessed on their abutting faces, to form, when the blocks are closed together the divided or two-part glass receiving cup, G.

The blocks F and F' are provided with internal chambers 25 for the circulation of cooling water, each of said chambers being provided with an inlet port and an outlet port.

The pivot block D is axially bored, being characterized by a large lower bore 26, and a smaller intermediate bore 27, which bores are separated by an annular shoulder 28. At the upper end of the intermediate bore 27 is an internal shoulder 29, and above the latter a larger top bore 30 whose walls are cut away at either side, as at 31.

H is the upper valve block having an enlarged head at its lower end, and which is inserted up into the block D with its head bearing against the under side of the shoulder 29 and its body extending up into the top bore 30. I is the lower valve block having its enlarged head at its upper end fitting in the bore 27 while its body protrudes down through the lower bore 26. 32 is a shouldered ring which fits up against the head of the block I to hold the latter in place, and which is held in position by the screw bolts 33 extending through said ring into threaded holes in the shoulder 28. 34 is a helical spring interposed between the blocks H and I to hold them snugly in place.

At diametrically opposed points the upper end of the block H is provided with radially disposed threaded ports 35 and 36, communicating, respectively, at their inner ends with vertical passages 37 and 38 which in turn communicate at their lower ends with the radially disposed and flaring ports 39 and 40 in the head of the block H.

41 and 42 are the water inlet and water outlet pipes connecting the inlet and outlet ports of the water chamber 25 of the cup block F with the ports 35 and 36 respectively of the block H. The cut away portions 31 of the block D provide clearance for the pipes 41 and 42.

Referring now to the lower valve block I, the same is provided at its lower end with diametrically opposed radial and threaded ports 43 and 44 which are connected respectively, by pipes 45 and 46 with the inlet and outlet ports of the water chamber 28 of the cup block F'. The inner end of the ports 43 and 44 connect, respectively, with the lower ends of the vertical passages 47 and 48 in said block, which passages at their upper ends connect respectively with the radial flaring ports 49 and 50.

The block D is provided at its front and rear with the diametrically opposed ports 51 and 52 which are threaded for the attachment of the water inlet supply pipe 53 and the outlet pipe 54, respectively.

The inner end of the port 51 is in constant communication with the flaring port 39 of the valve block H while the inner end of the port 52 is in like communication with the flaring port 40 of said block H, so that a continuous current of cooling water is maintained through the cup block F.

55 is an L shape passage in the block D which constantly connects the port 51 with the flaring port 49 in the head of block I, and similarly the similar L shape passage 56 maintains communication between the port 52 and the flaring port 50, thereby maintaining a continuous current of water through the water chamber 25 of the cup block F'.

Thus the cup blocks are water cooled at all times, the valve blocks H and I turning with their associated cup levers and blocks but always maintain an open passage through their respective cup blocks.

The cup is opened and closed by the retraction and extension, respectively, of the piston rod 15 in the cylinder C.

It is advantageous to receive and support the glass in the cup on a gaseous cushion, thus avoid chilling and hardening the glass by contact with the material of the cup.

For this purpose I introduce into the cup, just prior to the admission of the glass, a quantity of liquid, such, for instance, as water, which liquid is gasified by the heat, thus forming the gaseous cushion or cup lining which receives and supports the glass.

Thus 57 is a branch pipe which leads from the water supply pipe 53 to a cylindrical valve casing 58 mounted on the under side of the plate 7. 57$^a$ is a ball valve at the mouth of pipe 57 opening toward the cylinder 58. 59 is a discharge pipe connected to the cylinder 58 and having its other end down turned and flared so as to discharge into the cup G in its closed position. The end of the pipe 59 at the cylinder 58 is provided with a ball valve 59$^a$ closing toward the cylinder 58.

60 is a removable head for the cylinder at the end of the latter where the pipes 57 and 59 are connected at opposed points.

61 is a piston working in said cylinder, and 62 a helical spring interposed between said head and piston to normally retract the latter. The stem of said piston is threaded to adjustably receive the striking rod 63 which extends out through the end of the casing and is provided with an enlarged and rounded outer end or head 63$^a$. 63$^b$ is a stop plate which limits the outward movement of the piston. 62$^a$ is a lock nut on the rod 63. It is evident that the effective length of the rod 63 may be regulated by adjusting its insertion into the piston stem.

64 is a striking finger pivotally mounted on one of the cup parts. 64$^a$ is a stop pin which prevents said finger swinging relative to said cup part in the direction in which said part moves in closing, and 64$^b$ is a spring resiliently holding said finger extended and bearing against said pin 64$^a$.

It is evident that when the piston 61 is moved outwardly from the cylinder head 60, water will flow from the pipe 58 past the ball valve 57$^a$ and fill the valve casing, the valve 59$^a$ being forced closed. As the mold parts approach their closing position, the finger 64 in passing strikes the head 63$^a$ of the striking rod 63, thus forcing the piston 61 inwardly toward the head 60, closing the valve 57$^a$ and opening the valve 59$^a$, thus discharging the contents of the valve casing through the pipe 59 into the cup when the same is almost closed. Preferably when the cup is completely closed, the finger 64 has passed beyond and out of contact with the head 63$^a$, thus permitting the spring 62 to force the piston 61 away from the head 60, thereby closing the discharge valve 59$^a$, and refilling the valve casing.

As the cup opens, the finger 64 trails over the head 63$^a$ without driving the same inwardly.

The effective capacity of the cylinder, and thus the quantity of liquid discharged at each inward movement of the piston may be regulated by adjusting the insertion of the striking rod in the piston stem.

Thus each time the cup closes, the same is supplied with an accurately measured quantity of liquid which becomes gasified and forms a cushion or lining for the cup to support the glass and prevent its becoming chilled and hardened.

I prefer to provide the recesses which coact to form the cup with a lining of asbestos or other porous material or substance, 65, which extends at least part way up the walls of the recess and acts to prevent the liquid forming in a puddle at the bottom of the cup; rather causing the same to be distributed about the walls of the cup, and thereby facilitating the formation and maintenance of the cushion. By flaring the free end of the pipe 60, the water is directed against the walls instead of entirely toward the bottom of the cup, thereby better distributing the liquid.

J is the shear operating cylinder which is supported in place in any convenient manner, and preferably adjustably as to its elevation, so as to permit the positioning of the shears in relation to the discharge orifice. Thus, in the drawings, I have shown the cylinder supported by a bracket 66, to which the head of the cylinder is secured, the upper end of the bracket being provided with vertically disposed slots 67 engaged by screw bolts 68 which enter threaded holes in the boot casing, thus permitting the shear mechanism to be raised or lowered, as may be desired.

The piston rod 69 of said cylinder has attached to its outer end a block 70 to which is secured a cross head 71 sliding on the two guide rods 72 which themselves slide in bearing holes in the cylinder head. The outer ends of said rods 72 are rigidly connected together by the cross head 73. K represents a pair of shear blades pivotally connected together and mounted on the cross head 73. Said blades are provided with the angularly disposed slots 74 engaged by pins 75 carried by the twin plates 76 extending forwardly from the block 70. 77 are helical springs coiled about the rods 72 between the cross heads 71 and 73. 78 are nuts screwed on the inner ends of the rods 72 and adapted to contact with the cylinder head to limit the outward extension of the cross head 73. By adjusting the nuts on said rods, the degree of said extension may be regulated, so that when a shearing operation is to take place, the shears will be properly positioned under the discharge orifice B. It is evident that when the piston rod travels outwardly the cross heads 71 and 73 will also move. When the rods 72 are sufficiently extended to bring the nuts 78 in contact with the cylinder head, the cross head 73 will halt and the subsequent movement of the cross head 71 will compress the spring 77 and also close the shears together. The relief of the pressure in the rear of the piston in cylinder J will permit the springs 77 to expand, thus opening the shears. The admission of fluid pressure in front of said piston will cause the shears to be retracted from beneath the discharge orifice into the position shown in Figs. 11 and 12.

L is the plunger which reciprocates in the boot in alinement with the discharge orifice B.

Figures 1, 2, 3, 3A:
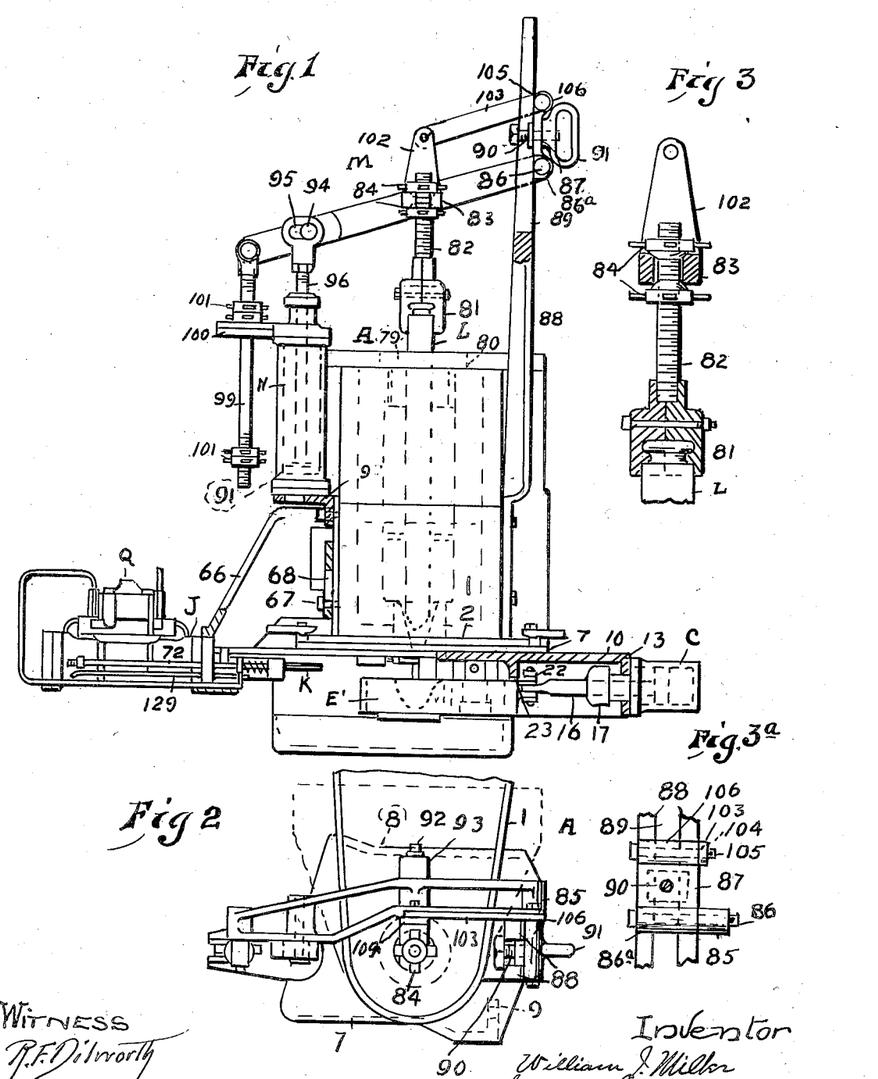
Figure 4:
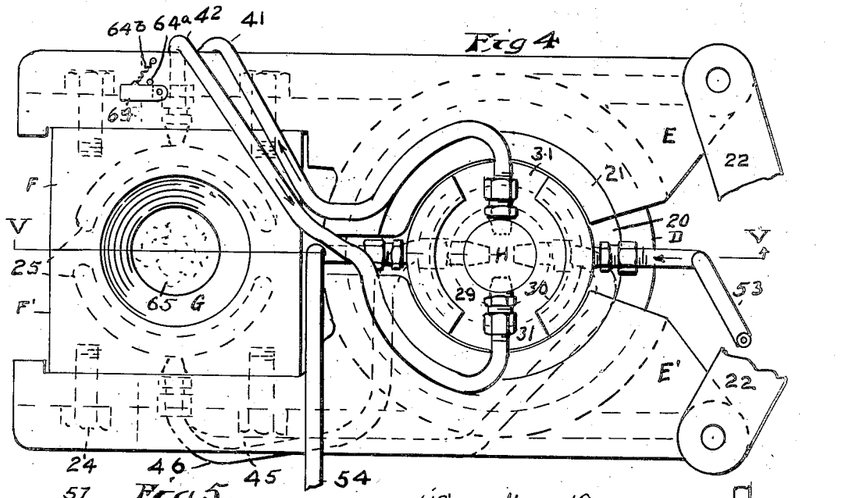
Fig. 4 is a plan view of the divided cup, shown closed, the cup arms and the pivot mechanism for the same.
Figures 5, 6, 7, 8, 9:
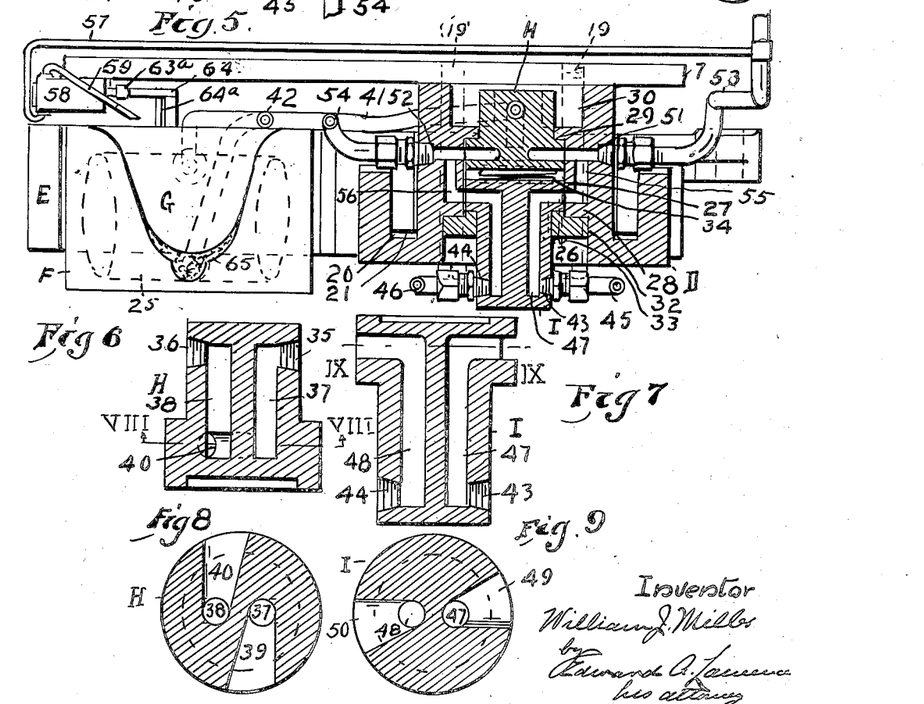
Fig. 5 is a longitudinal section along the line V—V in Fig. 4.
Figs. 6 and 7 are enlarged longitudinal sections of the upper and lower valve blocks, respectively.
Figs. 8 and 9 are sectional views taken, respectively, along the lines VIII—VIII in Fig. 6 and IX—IX in Fig. 7.

Said plunger is of refractory material and extends up through the bore of a bushing 79 which is seated in an aperture 80 in the roof of the boot A. The upper end of said plunger is grooved circumferentially so as to be engaged by a split socket 81 on the lower end of a threaded rod 82, which is adapted to be inserted laterally into a horizontally disposed fork 83 whose top and bottom faces are dished or concaved, as shown in Fig. 3. 84 represents upper and lower clamping nuts screwed on the rod 80 above and below the fork, having convexed surfaces which fit into and ride in the dished seats on the fork 83. By loosening the nuts the plunger may be dismounted, and by adjusting said nuts on said rod the plunger may be raised or lowered relative to fork 83, as may be desired.

M is a walking beam having one end provided with a horizontally disposed sleeve bearing 85 through which passes a pivot bolt 86 which is also journaled in a similar sleeve bearing 86ª on the outer face of a plate 87 which fits against the outer face of a post 88 extending up from the boot A. Said post is vertically slotted as shown at 89 in Fig. 1. 90 is a bolt having an enlarged head which fits against the inner face of the post and whose shank extends through the slot 89 and through a hole in the plate 87. 91 is a hand nut screwed on the end of the bolt 90, so as to clamp the plate 86 at any desired elevation relative to the post 88. Thus the fulcrum of the walking beam M may be raised or lowered, as desired, to give the desired throw of the plunger L.

The fork 83 is provided with an integral pivot pin 92 which is journaled in a horizontally disposed sleeve bearing 93 integral with or attached to the walking beam intermediate of the ends of the latter.

Near its other end said walking beam is provided with a horizontally disposed pivot bolt 94 whose headed end engages the horizontally slotted head 95 screwed on the upper end of a piston rod 96 attached to the piston 97 working in a vertically disposed cylinder N mounted on a bracket 98 carried by the boot A.

It is evident that the reciprocation of the piston 97 in the cylinder N will raise and lower the plunger L in relation to the inner end of the discharge orifice B. To the adjacent end of the walking beam M is pivotally attached a rod 99 which depends through a guide hole in the projection 100 of the cylinder head. 101 represents nuts screwed on threaded portions of the rod 99 above and below the projection 100, thus adjustably determining the limits of movement of the plunger L.

102 represents a plate integral with or rigidly attached to the fork 83 and extending vertically therefrom. The upper end of said plate is pivotally connected to a link 103, disposed parallel with the walking beam M and having its outer end provided with a bearing hole 104 in which is inserted a pivot bolt 105 also seated in a sleeve bearing 106 on the plate 86. Thus the fork 83 maintains its position in the same vertical plane as the plunger rises and falls.

Although the various mechanisms shown and described may be operated by any means capable of proper synchronization and timing, I prefer to use fluid pressure for this purpose.

Figure 13:
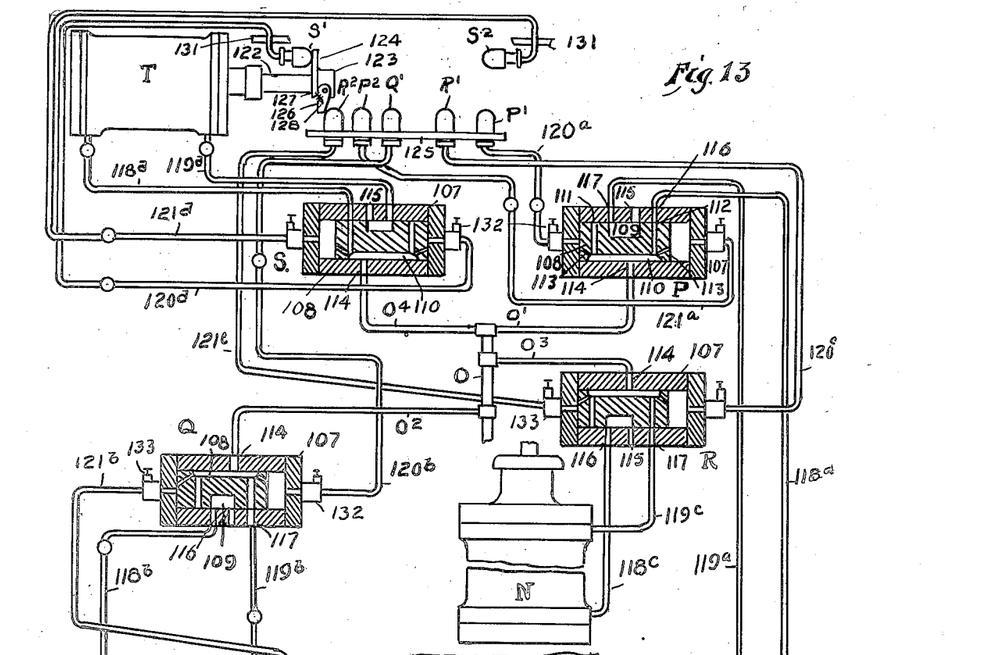
Fig. 13 is a diagrammatic view showing the fluid pressure operation and control of the feeder.

Referring now to Fig. 13, which is a diagrammatic view, showing the fluid pressure operation and control which I prefer to use in connection with my improved feeder, O represents a compressed air or other fluid pressure supply pipe in which the necessary pressure is maintained. P represents an automatic control valve for the cup cylinder C. Q and R represent similar valves for the shear cylinder J and the plunger cylinder N, respectively, and S is a similar valve for the timing cylinder T.

The automatic control valves are of the following construction. 107 represents the valve casing having closed ends and containing the sliding valve body 108 which on one side is provided with a recess 109 and on its opposite side with a groove or longer recess 110. 111 and 112 represent a pair of diametric passages connecting the ends of the groove 110 with the other side of the valve body beyond either end of the recess 109. 113 represents small bleeder passages connecting the ends of the groove 110 with the ends of the casing 107, so that pressure is gradually reestablished in the ends of the valve casing after its exhaustion through the bleeder valves to be described.

114 represents a port in the center of one side of the valve casing, always in communication with the groove 110, and this port is connected to the pipe O so that pressure is constantly supplied to the groove 110. Thus the valve P has its port 114 connected to pipe O by the branch pipe O', while the ports 114 of the valves Q, R and S are connected to the pipe O by the branch pipes $O^2$, $O^3$ and $O^4$.

On their opposite sides the automatic valves are provided with a row of equally spaced ports 115, 116 and 117. The port 115 is at the center and is an exhaust port open to atmosphere, while the ports 116 and 117 are so positioned that when the valve body 108 is shifted to one end of the casing one of said latter ports is connected to exhaust through the recess 109 and the port 115 while the other of said two ports is in registration with the adjacent diametric passage 111 or 112. When the valve body is shifted to the other end of the casing the other of the two ports, 116 or 117 is connected to the exhaust while its mate is registered with the adjacent diametric passage. Thus the port 116 is connected to pressure and the port 117 to exhaust or vice versa according to the position of the valve body.

The ports 116 of the automatic valves are connected by pipes with the rear end of the corresponding fluid pressure cylinders. Thus the said ports 116 of the valves P, Q, R and S are connected, respectively by the pipes $118^a$, $118^b$, $118^c$ and $118^d$ with the rear ends of the cylinders C, J, N and T, while ports 117 of said valves are similarly connected by the pipes $119^a$, $119^b$, $119^c$ and $119^d$ with the front ends of the cylinders C, J, N and T.

The ends of the automatic valve casings are each connected by pipes to bleeder valves which are actuated by moving elements to exhaust the pressure, which has accumulated through the bleeder passages 113, in the corresponding ends of the casings, thus causing the valve bodies to shift because of the unbalanced pressure in the opposite ends of the valve casing.

Thus the left end of the casing of valve P toward which the valve body must shift to admit fluid pressure to the rear end of the cup cylinder C, is connected by a pipe $120^a$ to a hooded bleeder valve P', while the opposite end of said casing, toward which the valve body must shift to admit pressure to the front end of cylinder C is connected by the pipe $121^a$ to the bleeder valve $P^2$.

It is evident that as an automatic valve admits pressure to one end of its associated fluid pressure cylinder, it exhausts the pressure from the opposite end of said cylinder.

The pipes $120^b$, $120^c$ and $120^d$ connect the corresponding ends of the valves Q, R and S with the bleeder valves Q', R' and S', respectively, while the pipes $121^b$, $121^c$ and $121^d$, connect the opposite ends of the said valves to the bleeder valves $Q^2$, $R^2$ and $S^2$.

The bleeder valves P', $P^2$, Q', R', $R^2$, S' and $S^2$ are hooded valves whose construction is more fully set forth in my patent application Serial Number 325,616 now on file in the United States Patent Office and for the present purposes it is sufficient to say that when said valves are engaged by a moving element in passing, the valves are momentarily opened, relieving the pressure in the ends of the valve casings to which they are connected, said pressure being more slowly reestablished through the bleeder passages 113 whose capacity is less than the pipes to which the bleeder valves are connected.

The bleeder valve $Q^2$ is of the ordinary spring plunger type and the same is mounted on the head of the cylinder J.

It is of course understood that when a bleeder valve is actuated, the pressure is exhausted from the end of the valve casing to which said bleeder valve is connected, causing the valve body to shift to the said end of the casing.

The piston rod 122 of the timing cylinder T is provided with a flattened portion or plate 123 which carries the striking fingers which engage the bleeder valves P', $P^2$, Q', R', $R^2$, S' and $S^2$. Thus the fixed finger 124 at the completion of the outstroke of the piston engages and actuates the bleeder valve $S^2$, thus relieving the pressure in the rear end of the cylinder T and admitting the pressure to the front end of the cylinder, and thereby causing said piston rod to move inwardly. And the rod completes its inward movement, the finger 124 actuates the bleeder valve S', thus relieving the pressure in the front end of the cylinder and admitting the pressure in the rear end of the same, and thereby starting the piston rod outwardly once more. Thus the piston rod of the timer cylinder J is automatically caused to reciprocate.

The bleeder valves R′, P², Q′, R² and P′ are slidably or adjustably mounted on a support 125 adjacent to the path of movement of the plate 123, the valves being preferably arranged in the order named.

126 is a striking finger pivotally mounted on the plate 123 and resiliently held against a shoulder 127 by means of a spring 128. Thus as the piston rod of the cylinder T is extended, the finger 126 will in turn engage and temporarily open the bleeder valves R², P², Q′, R′ and P′, but during the retractive movement of said piston rod, said striking finger will trail over the hoods of the valves without opening the valves.

The opening of the bleeder valve R² will result in shifting the automatic valve R, thus relieving the pressure from the lower end of the plunger cylinder N and admitting pressure to the upper end of the same, thereby depressing the plunger and interrupting the flow of glass through the orifice B, causing the neck of glass at the lower end of the orifice to thin by stretching. The finger 126 next engages and temporarily opens the bleeder valve P², which shifts the automatic valve P so that pressure is admitted to the front end of the cup cylinder C and exhausted from the rear end of the same, thus opening the cup G, thus allowing the gob of glass to drop further attenuating the neck which still connects the gob to the discharge orifice. The finger 126 next temporarily opens the bleeder valve Q′, thereby shifting the automatic valve Q so that the pressure is admitted to the rear end of the shear cylinder J and exhausted from the front end of the same, thus causing the shear to be advanced into position under the discharge orifice B and closed to shear the neck of glass, thus severing the falling gob which now forms a completed gather and drops into or is conveyed to the waiting mold.

Figure 10:
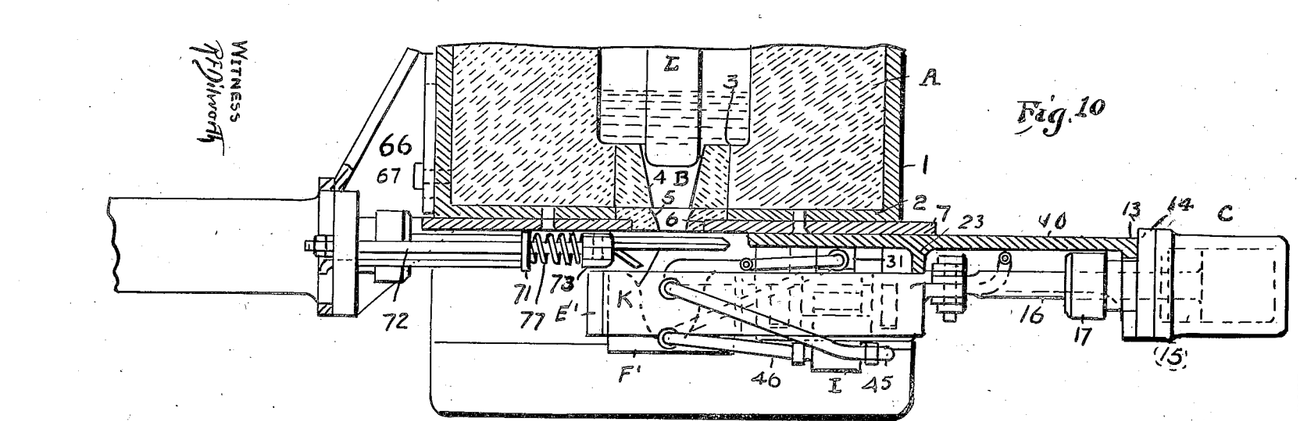
Fig. 10 is an enlarged vertical section of the lower part of the boot and of the feeder and taken on a plane parallel to Fig. 1.
Figure 11:
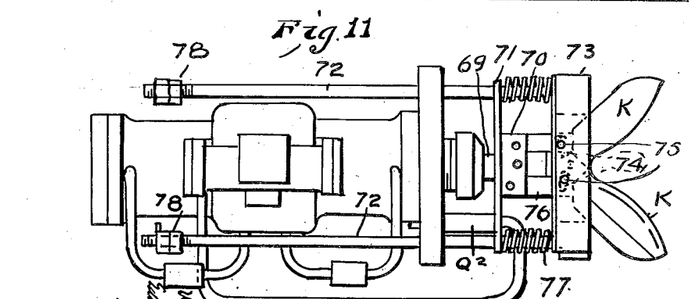
Fig. 11 is an enlarged plan view of the shear mechanism, the same being shown retracted.
Figure 12:
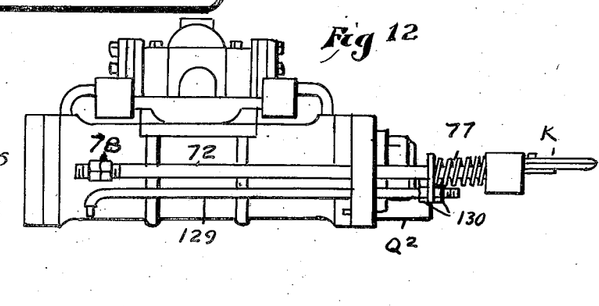
Fig. 12 is a side view of the same.

The bleeder Q², as described, is mounted adjacent to or on the head of the cylinder J, and 129 is a striking rod secured to the cross head 71 and provided with a hooked end which, when the cross head 71 has completed its outward movement and has closed the shears, engages and opens the bleeder valve Q², thereby relieving the pressure in the rear end of the cylinder J and admitting pressure in the front end of the same, thereby opening the shears and retracting the same from the position shown in Fig. 10 to the position shown in Figs. 1, 11 and 12. The end of the striking rod 129 is inserted through a hole in the cross head 71 and nuts 130 are screwed up on said rod on either side of the cross head, whereby the effective length of said rod can be regulated so as to actuate the bleeder valve at just the proper movement. Thus the shears are promptly reopened and retracted out of the way, after severing the neck.

Referring again to the striking finger 126, its continued travel causes it to next actuate the bleeder valve R′, thus causing the automatic valve R to shift, so that pressure is admitted to the lower end and relieved from the upper end of the plunger cylinder N, thus raising the plunger and permitting the flow of glass out through the orifice B to be resumed.

The finger 126 next operates the bleeder valve P′, which shifts the automatic valve P, so that pressure is relieved from the front end of the cylinder C and admitted to the rear end of the same, thereby closing the cup to catch and accumulate the glass which has resumed its flow from the orifice B.

The fixed finger 124 now reaches and opens the bleeder valve S² which results in reversing the movement of the plate 123, during which movement the finger 126 will trail over the bleeder valves P′, R′, Q′, P² and R² without operating the same. When, during the retractive movement of the plate 123 the finger 124 reaches and actuates the bleeder valve S′, the plate 123 starts outwardly again and the above described operations are repeated.

The period of retractive or idle movement of the finger 126 determines the dwell of the closed cup under the discharge orifice during which the gob of glass is being accumulated and built up to the desired character.

The ability to shift the bleeder valves on the support 128 permits the proper timing of the actions of the different mechanisms and their adjustment in relation to each other. Thus I have shown the bleeder valves R², P² and Q² close together so that the functions accomplished by the actuation of said bleeder valves may follow each other closely. A greater interval is shown provided between the bleeder valves Q′ and R′, thus delaying the upward start of the plunger until the shears have been reopened and retracted out of the way by the actuations of the bleeder valve Q². A less interval occurs between the bleeder valves R′ and P′, it being only necessary to close the cup G under the orifice after the glass has once more started to flow down therefrom.

I prefer also to make the timed cylinder bleeder valves S′ and S² adjustable as to positions or supports 131 so that the reciprocation of the plate 123 may be properly regulated to produce the timing required to form the particular character of gathers desired.

In the operation of my device, the cup is caused to open just before the shearing operation to permit the gob to begin to drop, thereby stretching the neck and assisting the severing of the gather. The plunger should seat before the gob is dropped so that the flow of glass will be halted to assist in thinning the neck for the shearing and until the cup is about to close. The plunger should preferably be raised before the cup closes so as not to delay the building up of the next gob.

The relative operations of the various mechanisms should be carefully adjusted and timed so that the necessary amount of glass to form the desired size of gob will have an opportunity to be built up in the cup. Also the varying fluidity of the glass will require regulation of the operation of the plunger.

This regulation can be readily and accurately attained by adjusting the movements of actuation of the various bleeder valves.

As an aid to the regulation of the operative mechanism I prefer to provide the automatic valves with hand operated bleeder valves 132 and 133 and stop valves in the various bleeder valves pipes so that any one of the associated mechanisms can be quickly put out of service.

The advantages of my invention are manifold. Among them may be mentioned the following. The gathers may be properly and accurately sized and proportioned to suit the requirements of the particular ware being fabricated. The action of the mechanism is positive so that when once adjusted the gathers produced will be uniform. The chilled and hardened end, heretofore characteristic of gathers formed by the cup method are eliminated.

Although, for the sake of clearness of description, I have described in detail the embodiment of the principles of my invention shown in the drawings, I do not wish to limit myself thereby, but claim broadly:—

1. In the feeding of glass, the process of producing measured and shaped mold charges which consists in discharging a measured mass of glass through the discharge orifice of a tank or other container, introducing a measured quantity of liquid into a suitable forming receptacle which liquid is gasified by the heat to produce a cushion in said receptacle, catching the measured mass in said receptacle to impart thereto the desired contour and thereby complete the formation of the mold charge, discharging the completed mold charge from said receptacle, and severing the neck connecting the said mold charge with the discharge orifice.

2. In the feeding of glass, the process of producing measured and shaped mold charges which consists in discharging a measured mass of glass through the discharge orifice of a tank or other container, introducing a measured quantity of liquid into a suitable forming receptacle which liquid is gasified by the heat to produce a cushion in said receptacle, catching the measured mass in said receptacle to impart thereto the desired contour and thereby complete the formation of the mold charge, retarding the travel of glass through said discharge orifice to attenuate the neck, discharging the completed mold charge from said receptacle, and severing the neck connecting said mold charge with the discharge orifice.

3. In the feeding of glass, for use in connection with a tank or other container provided with a discharge orifice the combination of means for intermittently detaching the glass discharged from said orifice, a divided cup adapted alternately to be closed beneath said orifice to catch the glass and shape the mold charge, and then to be opened to discharge said mold charges, and means for injecting a quantity of liquid into the cup which is gasified by the heat to form a gaseous cushion between the glass and the cup to prevent hardening of the glass.

4. In the feeding of glass, for use in connection with a tank or other container provided with a discharge orifice, the combination of a gathering cup adapted to be positioned beneath said orifice to catch the glass and form gobs, fluid pressure means for alternately presenting the cup to the orifice and discharging its contents, means for shearing the necks of glass connecting said gobs to said orifice, fluid pressure means for operating said shearing means, means co-acting with said orifice to intermittently interrupt the travel of the glass therethrough, fluid pressure means for operating said last mentioned means and a common control for all of said fluid pressure means.

5. In the feeding of glass, for use in connection with a tank or other container provided with a discharge orifice, the combination of a gathering cup adapted to be positioned beneath said orifice to catch the glass and form gobs, fluid pressure means for alternately presenting the cup to the orifice and discharging its contents, means for shearing the necks of glass connecting said gobs to said orifice, fluid pressure means for operating said shearing means, means co-acting with said orifice to intermittently interrupt the travel of the glass therethrough, fluid pressure means for operating said last mentioned means, and timer means controlling all of said fluid pressure means.

6. In the feeding of glass, for use in connection with a tank or other container provided with a discharge orifice, the combination of a gathering cup adapted to be positioned beneath said orifice to catch the glass and form gobs, fluid pressure means for alternately presenting the cup to the orifice and discharging its contents, means for shearing the necks of glass connecting said gobs to said orifice, fluid pressure means for operating said shearing means, means coacting with said orifice to intermittently interrupt the travel of the glass therethrough, fluid pressure means for operating said last mentioned means, and adjustable timer means controlling all of said fluid pressure means.

7. In the feeding of glass, for use in connection with a tank or other container provided with a discharge orifice, the combination of a gathering cup adapted to be positioned beneath said orifice to catch the glass and form gobs, fluid pressure means for alternately presenting the cup to the orifice and discharging its contents, means for shearing the necks of glass connecting said gobs to said orifice, fluid pressure means for operating said shearing means, means coacting with said orifice to intermittently interrupt the travel of the glass therethrough, fluid pressure means for operating said last mentioned means, an automatic valve for each of said fluid pressure means, and common actuating means for all of said automatic valves.

8. In the feeding of glass, for use in connection with a tank or other container provided with a discharge orifice, the combination of a gathering cup adapted to be positioned beneath said orifice to catch the glass and form gobs, fluid pressure means for alternately presenting the cup to the orifice and discharging its contents, means for shearing the necks of glass connecting said gobs to said orifice, fluid pressure means for operating said shearing means, means coacting with said orifice to intermittently interrupt the travel of the glass therethrough, fluid pressure means for operating said last mentioned means, an automatic valve for each of said fluid pressure means, and a timer controlling all of said automatic valves.

9. In the feeding of glass, for use in connection with a tank or other container provided with a discharge orifice, the combination of a gathering cup adapted to be positioned beneath said orifice to catch the glass and form gobs, fluid pressure means for alternately presenting the cup to the orifice and discharging its contents, means for shearing the necks of glass connecting said gobs to said orifice, fluid pressure means for operating said shearing means, means coacting with said orifice to intermittently interrupt the travel of the glass therethrough, fluid pressure means for operating said last mentioned means, an automatic valve for each of said fluid pressure means, and an adjustable timer controlling all of said automatic valves.

10. In combination with a container for molten glass provided with a discharge orifice, a tool reciprocating in the glass in relation to the orifice and acting to alternately discharge glass through said orifice and to restrict the travel of glass through said orifice whereby measured masses of glass are discharged from said orifice, a shaping receptacle mounted beneath said orifice and adapted to receive and shape the discharged masses of glass into completed mold charges, means for supplying a quantity of liquid to said receptacle previous to its receipt of each mass of glass which liquid becomes gasified by the heat and forms a supporting cushion for the glass, means for discharging the mold charges from said receptacle, and means for shearing the necks of glass connecting the said mold charges with said discharge orifice.

11. In combination with a container for molten glass provided with a discharge orifice, a tool reciprocating in the glass in relation to said orifice and acting to alternately discharge glass through said orifice and to restrict the travel of glass through said orifice whereby measured masses of glass are discharged from said orifice, a divided shaping cup mounted beneath said orifice to receive said measured masses of glass and shape the same into the completed mold charges, means for opening and closing said cup at proper intervals to discharge the completed mold charges, means for supplying liquid to said cup upon its closure after each discharge of a completed mold charge which liquid becomes gasified by the heat and forms a supporting cushion for the next mold charge, and means for severing the necks of glass connecting said mold charges to said discharged orifice.

12. In the feeding of glass, the combination of a mold forming cup adapted to receive molten glass discharged from a tank or other container and to shape the same to form mold charges, and means for supplying said cup with a measured quantity of liquid previous to the deposit of the glass therein, said liquid being gasified by the heat of the molten glass to form a gaseous cushion for the gather.

13. In the feeding of glass, the combination of a mold forming cup adapted to receive molten glass discharged from a tank or other container and to shape the same to form mold charges, means for opening said cup to discharge the mold charges and for closing the cup for the reception of the next deposit of glass, and means for introducing a quantity of liquid into the cup before the deposit of glass therein, which liquid is gasified by the molten glass to form a gaseous fluid to support the molten glass in the cup for the purpose described.

Signed at Pittsburgh, Pa., this 27th day of January, 1921.

WILLIAM J. MILLER.